Patented July 7, 1931

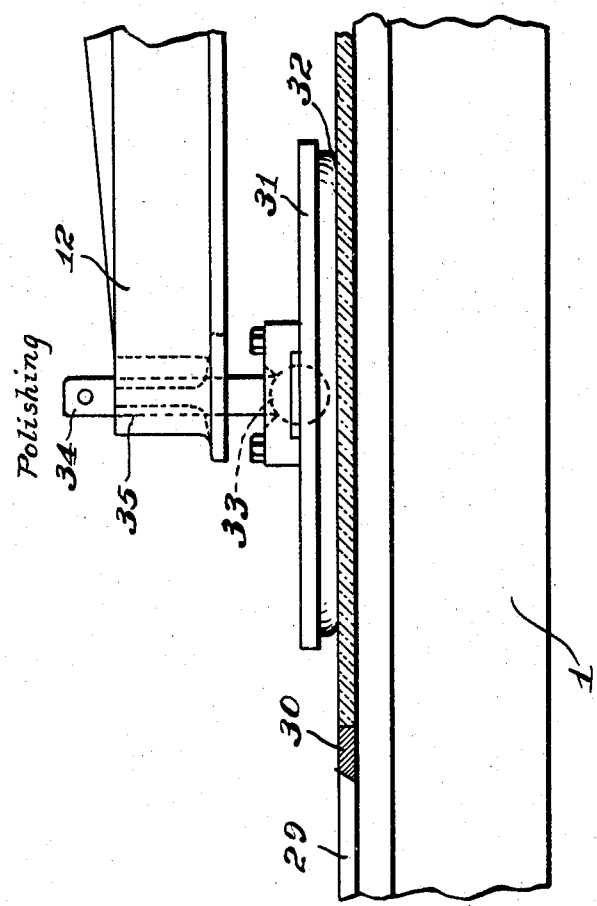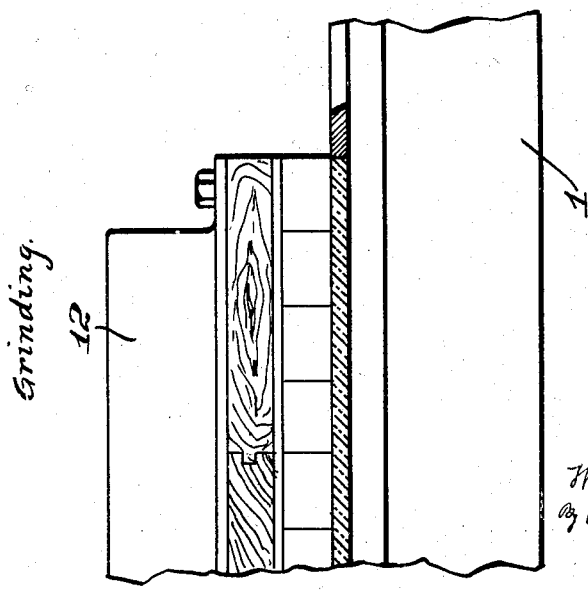

1,813,412

UNITED STATES PATENT OFFICE

WILLIAM H. MARR, OF SOUTH OIL CITY, PENNSYLVANIA

GLASS SURFACING MACHINE

Application filed September 8, 1928. Serial No. 304,774.

This invention relates to sheet glass grinding and polishing machines of the type in which the sheets of glass to be ground and polished are mounted on the top of a large circular work table, and in which the grinding or polishing is accomplished by means of grinding bars or polishing blocks which rest upon the upper surface of the glass on the table and are caused to rotate by their differential frictional engagement with the glass.

Heretofore in surfacing machines of the above described character it has been the customary practice to mount the glass to be ground and polished on the large circular work table in such a way that it extended over the entire top of the table.

In order to surface the glass located in the center of the table it was necessary to employ one large grinding or polishing runner which was large enough to extend from the edge to beyond the center of the work table, one smaller runner being also used but not operating on the central portion of the table.

In the central portion of the table the differential speed between the work table and the large runner and also the small runner was at a minimum, and the frictional engagement of the grinding bars or polishing blocks with the glass at that part of the table was very considerably less than it was at the outer portions of the table. Accordingly the glass in that section of the table was ground considerably slower than the glass in the other portion of the table. This condition was further augmented because only a single runner operated at this point and adjacent to the dead center. In other words there could be only one large runner which extended from the edge to past the dead center of the table; and, inasmuch as the surfacing of a table completely covered with glass was dependent on the grinding of the glass over its whole surface the time required was that necessary to surface the glass located in the center of the table and which could be operated upon by the large runner only. Hence production by such a machine was very slow.

It is the object of this invention to provide in a sheet glass surfacing machine of the above described character a plurality of equal diameter working runners which do not extend over the center of the work table, and to so position the glass to be surfaced on the table that it is all acted upon by each of the runners.

Another object of the invention is to provide a work table for a glass surfacing machine of the character described having an inactive zone in its center which is spanned by an elevated disc-like section whereby the coarse abrasive material used at the beginning of a grinding operation is prevented from lodging at the center and later escaping and scratching the glass while finer abrasive material is being used.

Figure 1:
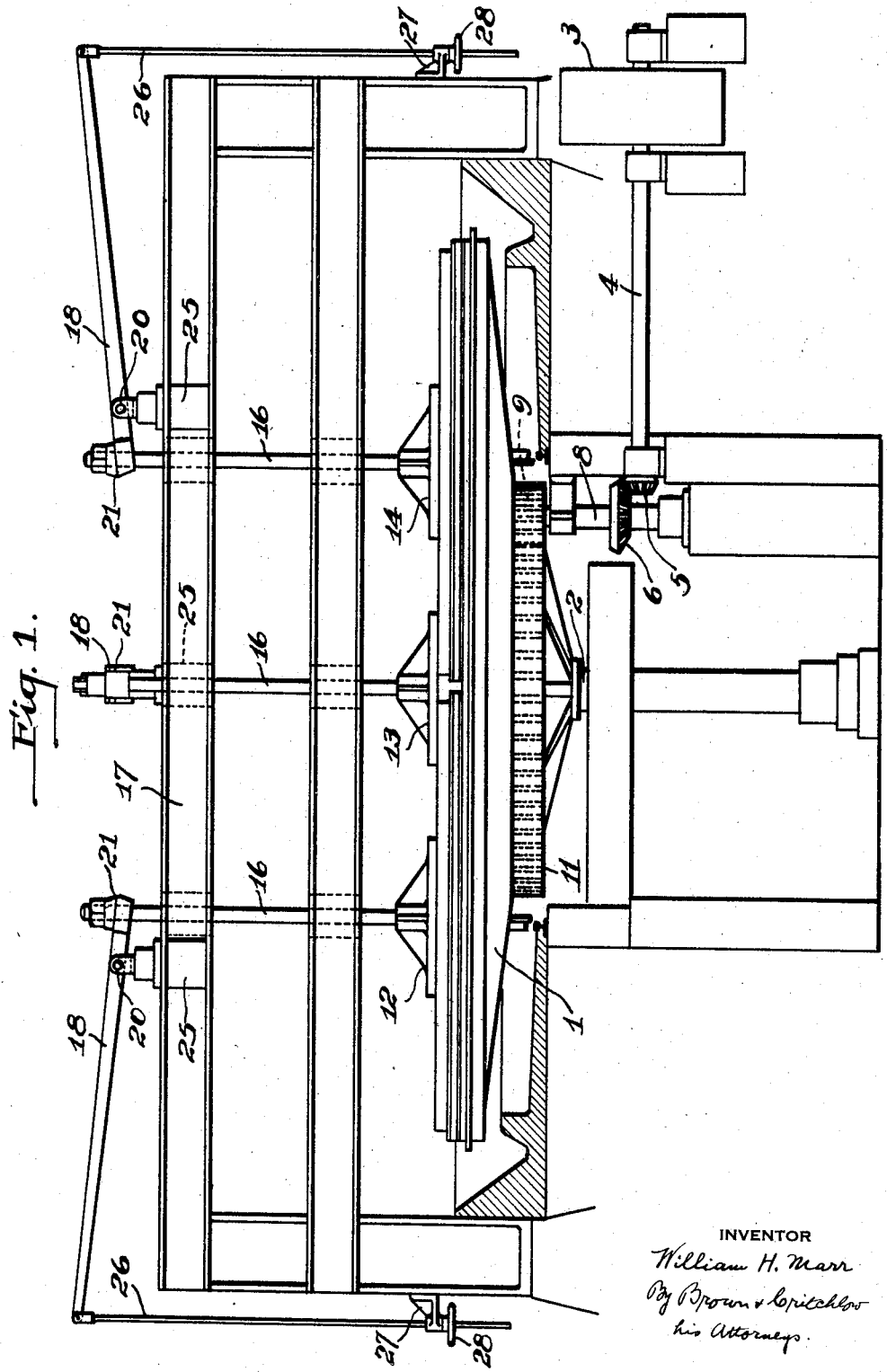
Figure 2:
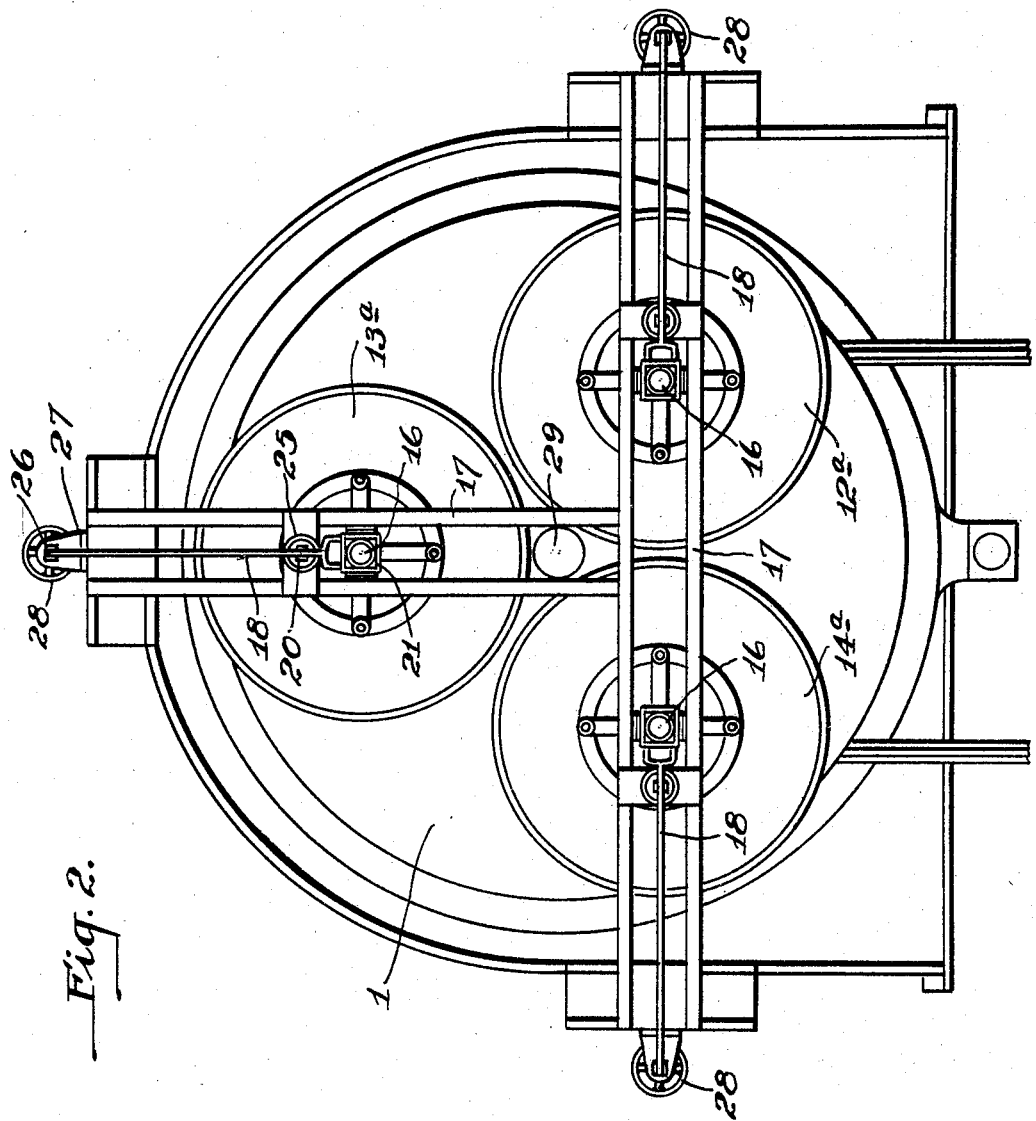
Figure 3:
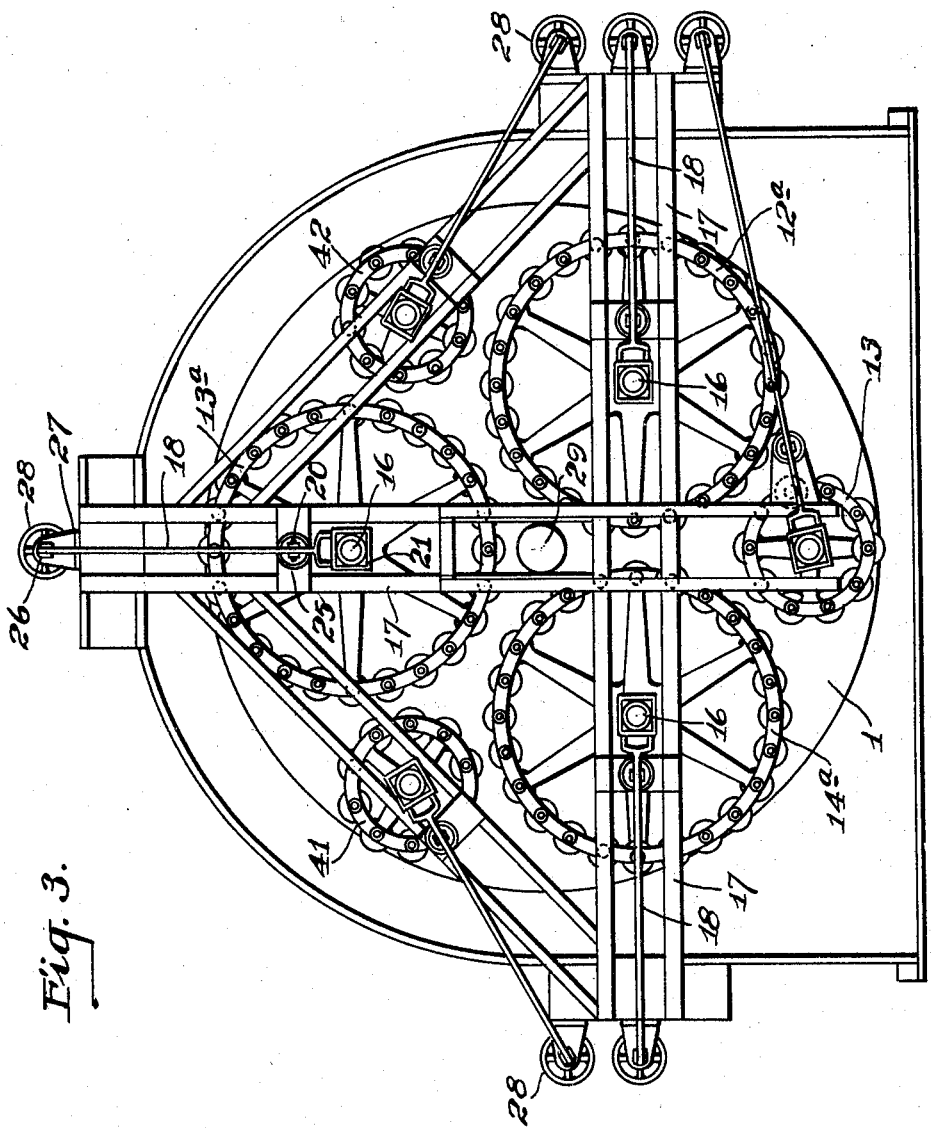

The novel features which characterize the invention, its advantages and its methods of operation will be better understood when the following detailed description is read in conjunction with the accompanying drawings, in which Fig. 1 is a side elevation of a glass grinding machine embodying the invention; Fig. 2 a plan view of a grinding machine showing the position of the working runners upon the table; Fig. 3 a plan view of a polishing machine showing the arrangement of the large and small polishing runners; Fig. 4 a cross sectional view showing a portion of a grinding runner and the grinding bars resting on the work table; and Fig. 5 a sectional view similar to Fig. 4 showing a portion of a polishing runner and a polishing block resting on the work table adjacent its central portion.

A sheet glass surfacing machine consisting of either a grinding or a polishing machine constructed in accordance with this invention comprises chiefly a horizontally disposed circular work table which is adapted to rotate on its vertical axis and has a horizontal glass supporting surface extending from its periphery to an inactive zone surrounding its center. The invention contemplates the mounting of the glass to be surfaced upon the work table by means of some such medium as plaster of Paris, as has been the customary practice. Upon the upper surface of the glass there are disposed a plurality of circular work runners, which in a polishing machine are polishing runners and in a grinding machine are grinding runners, each of which runners extends from the edge of the table to the inactive zone. These runners are rotatably mounted on vertical shafts carried by the frame of the machine above the table, and operably attached to each of the shafts are means for adjusting the position of the runners on the table, and for raising them from the table when desired.

In accordance with the invention the work runners are so constructed and positioned that their inner edges are spaced outwardly from the center of the table so that there will be a substantial differential speed between them and the table at their inner edge. Consequently the glass which is located in that portion of the table will be surfaced comparatively rapidly inasmuch as the surfacing depends directly on the differential speed between the runners and the glass. Hence the surfacing of the glass at that point is accomplished with considerably greater speed than glass located at the center of the table in the prior type of machine, not only because the speed of the runner is greater at its inner edge in this machine, but also because a plurality of runners are employed which are each adapted to operate on the whole surface of all the glass mounted on the table. While it is possible to surface glass in such a machine by utilizing but one work runner, it is preferable to employ a plurality of runners, three such runners being the most effective from the standpoint of efficiency, space and speed.

Having reference now to the illustrative embodiments of the invention, there is shown both a grinding machine, Fig. 2, and a polishing machine, Fig. 3, each comprising a circular work table 1, on which sheets of glass to be surfaced may be suitably mounted as referred to hereinbefore. The table is mounted on a vertical axis 2, Fig. 1, and adapted to be rotated in the usual manner, the actuating means herein illustrated consisting of a drive gear 3 attached to the outer end of a shaft 4 having a bevel gear 5 at its inner end meshing with another bevel gear 6 disposed on the lower end of a vertical shaft 8. On the other end of shaft 6 a pinion gear wheel 9 is mounted which meshes with a gear wheel 11 affixed to or made integral with the spider upon which the work table is rested.

A plurality of circular grinding runners 12, 13 and 14 or polishing runners 12a, 13a and 14a, respectively, are mounted above the table, each being carried on the lower end of a vertical shaft 16, which has its upper end mounted in the upper frame portion 17 of the machine. In order to raise and lower these working runners adjusting levers 18 are provided which are suitably connected at 21 to the upper ends of vertical shafts 16 and pivotally mounted intermediate their two ends to piston rods 20 which act as movable fulcrums and which are disposed in hydraulic cylinders 25. The outer ends of rods 18 are pivotally connected to rods 26 which are passed through openings in brackets 27 mounted on the side of the machine frame and retained by adjusting wheels 28 which are employed to raise and lower the runners, and by means of which micrometer adjustment of the frictional engagement between the grinding bar or polishing block and the glass mounted on the surface of the table may be accomplished. Means are provided for controlling the pressure in cylinders 25 to move levers 18 to effect the raising and lowering of the working runners, and while not shown, means may be provided for effecting the operation of wheels 28 and cylinders 25 so that all of the working runners will be adjusted simultaneously. Furthermore, piston 20 which forms a fulcrum for levers 18, may have a predetermined stroke, in which case the further adjustment of the runner is accomplished by means of handwheel 28.

It will be observed, and especially in Figs. 2, 3, 4 and 5, that the working runners do not reach into the center of the work table. Consequently, no glass to be surfaced is mounted there; and, as has been referred to hereinbefore, this is the inactive zone of the table. To prevent the collection and lodging of abrasive material in this inactive zone during the operation of the machine, a raised or disc-like section 29 is provided. The outer periphery of this disc may be beveled inwardly from the top downwardly, as indicated at 30, to provide a groove or inset into which the plaster of Paris used in securing the glass to the table may be keyed to aid in holding the glass to the table while it is being surfaced. Disc 29 may be formed integral with the table, or it may be attached thereto in the form of a separate member, and preferably it should extend slightly above the glass positioned on the surface of the table so that any abrading material collecting there may be readily removed to prevent the coarser abrading material lodging in the inactive zone and later scratch the glass during its finishing.

In the operation of the machine, the rough sheets or plates of glass are first laid on the table in a bed of plaster of Paris. After this has set, the table is placed on the grinding machine, the grinding runners 12, 13 and 14 lowered into operative position, and the table rotated by suitable driving means. The grinding operation consists in the application of abrasives which are caught between the surface of the glass and grinding bars 20 attached to the lower side of the grinding runners, rough sand being used as the first grinding medium. When the glass has been ground down, the process of smoothing commences, which consists in the application, without stopping the machine, of a series of sand applications each finer in grade than that which preceded it. After the last grade of sand is applied, a series of emeries are applied in a manner similar to the application of sand. When the final grade of emery has been applied the machine is stopped, and the table removed from the grinding machine, the coarse abrasive material all removed, and the surface of the plaster resmoothed. It is then placed in the finishing or polishing machine.

The polishing operation is very similar to the grinding operation except that the polishing machine is run somewhat slower than the grinding machine, and a much finer finishing medium, such as rouge, is employed for polishing the glass, and the working runners, instead of being provided with grinding bars, are equipped with felt covered polishing shoes. A preferred form of polishing shoe is shown in Fig. 5 and comprises a circular shoe 31 on which is mounted a felt or other suitable covering 32. Shoe 31 is pivotally connected at 33 to a pin 34 which is loosely mounted in an opening 35 provided in the runner. Consequently the weight of the block, pin, and felt is always directly on the glass.

As shown in Fig. 3, smaller polishing runners 41, 42 and 43 may be mounted in the machine in a manner similar to that described in connection with the large runners, and their adjustment may be accomplished in the same way and simultaneously with the large runners. Their purpose is to aid in polishing the glass positioned on the outer portion of the table.

After the one surface of the glass has been properly polished the table is removed from the polishing machine, the glass removed from the table, turned over and again affixed to the surface of the table and the grinding and polishing operation repeated.

Among the advantages of the invention is the provision in a surfacing machine of a plurality of equal diameter working runners each of which operates upon all of the glass mounted on the upper surface of a work table, and in which the glass mounted on the inner or central portion of the table is surfaced much faster than it was possible to surface the glass located in the center of old type of machines, the surfacing of which centrally disposed glass determined the time required for each operation. Consequently, a considerable increase in rate of operation is accomplished in a machine embodying this invention. It will be readily understood that the loss of space occasioned by the inactive zone in the central portion of the table may be offset simply by increasing the diameter of the work table a small amount. Furthermore, by employing working runners which are all the same size it is much easier to make repairs and replacements when necessary.

According to the provisions of the patent statutes, I have explained the principle and mode of operation of my invention, and have illustrated and described its preferred embodiment. However, I desire to have it understood that, within the scope of the appended claims, the invention may be practiced otherwise than as illustrated and described.

I claim:

1. A sheet glass surfacing machine, comprising a horizontally disposed circular work table rotatable on its vertical axis and provided at its center with an elevated portion extending over a central inactive zone, said raised portion being adapted to aid in anchoring glass to the table and in avoiding the collection of abrasive material in the center of the table, the remainder of the surface of the table forming a support for glass, a plurality of rotatable circular runners of equal diameter positioned above the table and each extending from its periphery to said inactive zone, and means for rotating the table, and said runners being rotated by frictional contact with the glass mounted upon said rotating table.

2. A circular work table for a glass surfacing machine having an elevated disc in its central inactive portion, the periphery of said disc being beveled inwardly from its top downward to the surface of the table, whereby means is provided for engaging the adhering medium utilized in attaching the glass to the table.

In testimony whereof, I sign my name.

WILLIAM H. MARR.